(12) United States Patent
Singh et al.

(10) Patent No.: US 9,370,004 B2
(45) Date of Patent: Jun. 14, 2016

(54) TRAFFIC MANAGEMENT FOR USER EQUIPMENT DEVICES

(71) Applicant: Sprint Spectrum L.P., Overland Park, KS (US)

(72) Inventors: Jasinder P. Singh, Olathe, KS (US); Siddharth S. Oroskar, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 122 days.

(21) Appl. No.: 14/215,682

(22) Filed: Mar. 17, 2014

(65) Prior Publication Data

US 2015/0264687 A1 Sep. 17, 2015

(51) Int. Cl.
*H04W 72/04* (2009.01)
*H04W 88/06* (2009.01)

(52) U.S. Cl.
CPC .......... *H04W 72/0453* (2013.01); *H04W 88/06* (2013.01)

(58) Field of Classification Search
None
See application file for complete search history.

(56) References Cited

U.S. PATENT DOCUMENTS

| 6,546,250 | B1* | 4/2003 | Turcotte | H04W 48/18 455/437 |
| 2011/0255516 | A1 | 10/2011 | Pawar et al. | |
| 2011/0292851 | A1 | 12/2011 | Fong et al. | |
| 2012/0231827 | A1* | 9/2012 | Oroskar | H04W 48/20 455/509 |
| 2013/0072209 | A1* | 3/2013 | Haartsen | 455/452.1 |
| 2013/0244656 | A1* | 9/2013 | Heo | H04W 52/0235 455/436 |
| 2013/0244722 | A1* | 9/2013 | Rousu et al. | 455/552.1 |
| 2014/0146697 | A1* | 5/2014 | Kim | H04W 24/08 370/252 |
| 2015/0131619 | A1* | 5/2015 | Zhu et al. | 370/332 |

OTHER PUBLICATIONS

Search Report and Written Opinion in application PCT/US2015/020999 mailed on Jun. 24, 2015 (12 pages).

* cited by examiner

*Primary Examiner* — Benjamin H Elliott, IV

(57) ABSTRACT

A UE may be configured to support wireless communication in two or more frequency bands. In some embodiments, the UE initiates a first wireless communication session in a first frequency band of the two or more frequency bands, and in response to initiating the wireless communication session in the first frequency band, the UE prevents itself from communicating in a second frequency band of the set of two or more frequency bands until the first wireless communication session has ended. Some embodiments further include subsequently enabling the UE to communicate in the second frequency band of the set of two or more frequency bands in response to ending the first wireless communication session in the first frequency band.

18 Claims, 3 Drawing Sheets

TRAFFIC MANAGEMENT FOR USER EQUIPMENT DEVICES

BACKGROUND

Unless otherwise indicated herein, the materials described in this section are not prior art to the claims and are not admitted to be prior art by inclusion in this section.

A wireless network may include a number of base stations that radiate to define wireless coverage areas, such as cells and/or cell sectors, in which user equipment devices (UEs) (also known as wireless communication devices (WCDs)) such as cell phones, tablet computers, tracking devices, embedded wireless modules, and other wirelessly equipped communication devices, can operate. Each base station may be coupled with network infrastructure that provides connectivity with one or more transport networks, such as the public switched telephone network (PSTN) and/or the Internet. With this arrangement, a UE within coverage area of the wireless network may engage in air interface communication with a base station and may thereby communicate via the base station with various remote network entities or with other UEs served by the base station.

In general, a wireless network may operate in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handoff between coverage areas, and functions related to air interface communication.

In accordance with the air interface protocol, each coverage area may operate on one or more carrier frequencies or blocks of frequencies (e.g., frequency bands, such as 698-960 MHz, 1610-2025 MHz, etc.) and may define a number of air interface channels for carrying information between the base station and UEs. These channels may be defined in various ways, such as through frequency division multiplexing, time division multiplexing, and/or code-division multiplexing. Each coverage area may include a pilot channel, reference channel or other resource on which the base station may broadcast a pilot signal, reference signal, or the like that UEs may detect as an indication of coverage and may measure to evaluate coverage strength. Each coverage area may also define one or more uplink control channels or other resources on which UEs may transmit control messages to the base station, and each coverage area may define one or more downlink control channels or other resources on which the base station may transmit control messages or other information to UEs. Each coverage area may then define one or more traffic channels or other resources for carrying traffic corresponding to communication sessions such as voice calls, video calls, web surfing, file transfers, and other types of traffic that are transmitted between the base station and UEs.

OVERVIEW

A wireless network may comprise multiple frequency bands in which UEs may communicate with base stations. Each frequency band may include a range of radio frequencies, such as 698-960 MHz, 1610-2025 MHz, etc., that are available for a UE to use for a communication session, such as a voice call, data transmission, etc. Even though multiple frequency bands may be available to the UE, the UE (alone or in combination with the RAN) typically selects one of the available frequency bands of the wireless network in which to conduct a communication session.

When a UE initiates a communication session in a selected one of the available frequency bands, it may be advantageous in some instances to prevent the UE from handing off to one or more of the non-selected frequency bands for the duration of the communication session. For example, a wireless network operator may prefer (but not necessarily require) UEs to use certain frequency bands for voice communications and to use other frequency bands for high-speed data communications because of (i) differences in characteristics of the air interface protocols in different frequency bands and/or (ii) differences in the amount of bandwidth that might be available in different frequency bands. In particular, voice communications typically require a lower amount of bandwidth at a constant rate with low transmission latency whereas data communications typically require a higher amount of bandwidth but at irregular intervals and with greater tolerance for latency as compared to voice. Thus, it may be preferable from a quality of service and/or network bandwidth management standpoint for a UE to implement voice communication sessions in frequency bands that provide (or that may be optimized for) lower latency and to implement data communication sessions in frequency bands that provide (or that may be optimized for) higher bandwidth transmission capability.

One way to prevent a UE from handing off to one or more of the non-selected frequency bands is to prevent the UE from being able to communicate in the one more non-selected frequency bands. Therefore, a UE according to some embodiments of the disclosed systems and methods may be configured to (i) initiate a wireless communication session in a selected one frequency band of a set of multiple available frequency bands in a wireless network, and (ii) in response to initiating the first communication session in the selected frequency band, prevent itself from communicating in one or more of the non-selected frequency bands for the duration of the first communication session.

In operation, the UE may prevent itself from communicating one or more of the non-selected frequency bands in multiple ways. In some implementations, the UE may disable (e.g., deactivate, power off, etc.) one or more radios configured to communicate in the non-selected frequency bands. The UE may additionally or alternatively activate one or more filters to block the reception of signals in the non-selected frequency bands. Additionally or alternatively, software running in the UE may prevent the UE from switching to (or handing off to) the non-selected frequency bands or otherwise block the UE from processing (or otherwise acting on) transmissions received in the non-selected frequency bands as long as the selected frequency band meets some minimal network requirements (e.g., RF characteristics, traffic loading, latency, etc.). Likewise, in other implementations, the UE may use other processes to prevent, disable, or otherwise block communication in the non-selected frequency bands.

After the wireless communication session has ended, the UE may then re-enable communication in one or more of the non-selected frequency bands. Depending on the implementation, the UE may re-enable communication by (i) enabling (e.g., activating, powering on, etc.) one or more previously disabled radios, (ii) deactivating one or more previously activated filters, and/or (iii) releasing a previously enacted software-based block. After the UE has re-enabled its ability to communicate in one or more of the non-selected frequency bands, the UE may thereafter initiate a subsequent communication session in any of the enabled frequency bands.

In one example, the UE may be a Long Term Evolution (LTE) device operating in a wireless network that includes LTE bands 25, 26, and 41. In operation, the UE may initiate a wireless communication session (e.g., a voice call) in LTE band 25, for example. The voice call may be an outbound (i.e., placed by) or inbound (i.e., received by) call. In response to initiating the voice call in LTE band 25, the UE may then prevent itself from sending or receiving communications in LTE bands 26 and 41 for the duration of the voice call, thereby preventing the UE from handing off the voice call to LTE bands 26 or 41. Alternatively, the UE may disable only one of the three frequency bands (e.g., LTE band 41) such that communication in the other bands except for LTE band 41 (e.g., LTE bands 25 and 26) remain enabled. After completion of the voice call in LTE band 25, the UE may enable subsequent wireless communication in the previously disabled frequency bands, including LTE band 41 (and possibly LTE band 26 too). Other LTE examples could involve different types of LTE devices, communication sessions other than voice, greater or fewer LTE bands, different LTE bands, etc. Similar arrangements with protocols other than LTE could be implemented as well.

This overview is illustrative only and is not intended to be limiting. In addition to the illustrative aspects, embodiments, and features described above, further aspects, embodiments, and features will become apparent by reference to the figures and the following detailed description.

DETAILED DESCRIPTION

The disclosed systems and methods are described herein with reference to the figures. It should be understood, however, that numerous variations from the depicted arrangements and functions are possible while remaining within the scope and spirit of the claims. For example, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For example, one or more processors may execute one or more sets of programming instructions as at least part of carrying out of one or more of the functions described herein.

Figure 1:
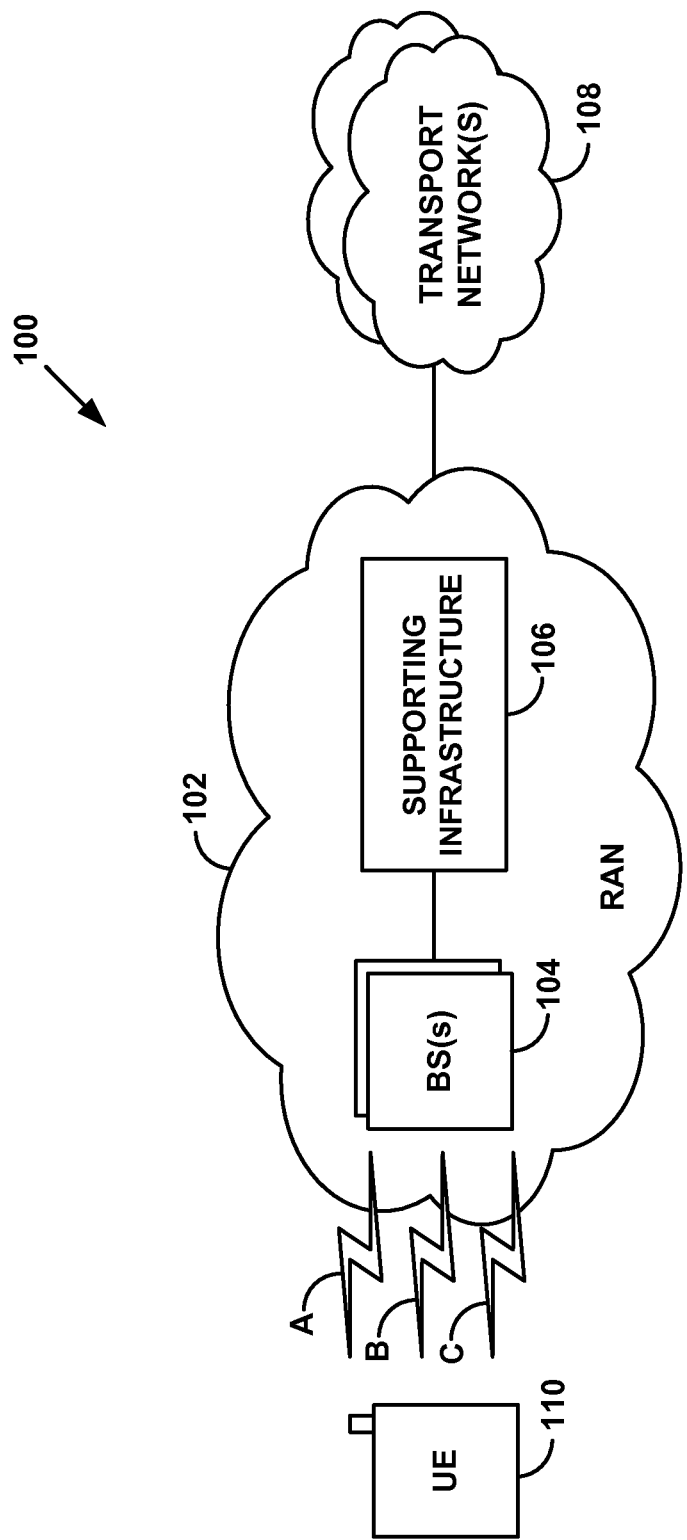
FIG. 1 is a simplified block diagram of an example communication system comprising a UE according to some embodiments of the disclosed systems and methods.

FIG. 1 is a simplified block diagram of an example communication system comprising a UE according to some embodiments of the disclosed systems and methods. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For example, one or more processors executing instructions stored in memory may implement one or more of the feature and functions described herein.

The example communication system 100 shown in FIG. 1 includes a radio access network (RAN) 102 having one or more base stations 104 (e.g., base transceiver stations (BTSs), access nodes, node-Bs, eNodeBs (eNBs), or the like). The example RAN 102 is configured to communicate with UEs in one or more of the three frequency bands shown as frequency bands A, B, and C. Each frequency band includes one or more carrier frequencies or blocks of frequencies. In some embodiments, each frequency band may be defined by a particular wireless industry standard. However, each frequency band need not correspond to any particular industry standard and instead could be any range and/or block of frequencies. In some LTE-based embodiments, frequency bands A, B, and C may correspond to LTE band 25 (1850-1995 MHz), LTE band 26 (814-894 MHz), and LTE band 41 (2496-2690 MHz), respectively. Other LTE embodiments may use fewer or greater than three LTE bands or even different LTE bands. Still further embodiments may use protocols other than LTE, such as CDMA, GSM, etc. And still further embodiments may use one or more frequency bands with one protocol and use other frequency bands with other protocols.

Additionally, the RAN 102 includes supporting infrastructure 106, such as a base station controller, radio network controller, mobility management entity, mobile switching center, and/or gateway, which may function to control aspects of base station operation and/or to provide connectivity with one or more transport networks 108 such as the PSTN and/or the Internet. The supporting infrastructure 106 may include other components as well.

FIG. 1 also shows a representative UE 110 positioned within the coverage area provided by the RAN 102. The example UE 110, which is configured to communicate in frequency bands A, B, and C, may be any type of device that is configured to engage in wireless communication with the RAN 102 and equipped to carry out the various UE functions described herein. For example, the UE 110 may be a cell phone, or wirelessly-equipped tablet, computer, tracking device, appliance, embedded wireless module, or other wirelessly-equipped device of a type now known or later developed. The UE 110 may include various components (e.g., radio(s), antenna(s), etc.) configured to enable wireless communication in one or more of the available frequency bands of the RAN 102 (i.e., frequency bands A, B, C).

In operation, the UE 110 and the RAN 102 may communicate with each other in any of frequency bands A, B, and/or C according to one or more air interface protocols, such as CDMA, LTE, GSM, etc. Each frequency band may include various downlink and uplink channels on one or more carrier frequencies. One such downlink channel may function as a broadcast channel on which a base station in the RAN transmits a pilot signal, reference signal, or the like that identifies or exists in the frequency band. UEs may scan the pilot/reference signal as a basis to determine coverage strength for the frequency band. Further, an uplink channel may function as an access channel having timeslots or the like in which UEs can transmit to the RAN requests (e.g., access probes) to register with, connect with, or hand off to the frequency band. Further, each frequency band may include a control channel that carries various overhead messages, such as LTE System Information Blocks (SIBs) or the like, specifying characteristics and operational parameters of the frequency band.

The UE 110 may initiate a communication session in any one frequency band of the set of available frequency bands A-C. The communication session may be any type of communication session, such as a voice call (including circuit-switched voice, Voice over IP (VoIP), Voice over LTE (VoLTE), etc.), a video call, video streaming, web browsing, file upload/download, messaging, a gaming session, or any other type of communication session. The UE 110 (alone or in combination with the RAN 102) may initiate the communication session based on outbound or inbound messaging between the UE 100 and the RAN 102. For example, the UE 110 may initiate a voice call in response to either (i) a request from a subscriber to place an outbound call from the UE 110 or (ii) messaging and/or signaling from the RAN 102 for the UE 110 to receive an inbound call. Similarly, the UE 110 may initiate a data or video transmission in response to one of (i) a request from a subscriber to send data or video, or (ii) messaging and/or signaling corresponding to data or video intended for the UE 110 that is sent from the RAN 102 to the UE 110.

As mentioned previously, the UE 110 may initiate a communication session in any one or more of the frequency bands of the set of available frequency bands A-C. The UE 110 and/or RAN 102 (individually or collectively) may select which frequency band to use for the communication session. In operation, the UE 110 and/or RAN 102 may select which frequency band to use based on the type of communication session. To use the LTE example again, the UE 110 and/or RAN 102 may (i) select LTE band 25 or LTE band 26 for voice calls, and (ii) select LTE band 41 for data transfers, for example.

In response to initiating the communication session in the selected frequency band, the UE may then prevent itself from receiving and/or sending wireless communications in one or more of the other, non-selected frequency bands. In the LTE example where frequency bands A, B, and C correspond to LTE bands 25, 26, and 41, the UE 110 may initiate a communication session in one of the frequency bands, e.g., LTE band 25 (1850-1995 MHz). In response to initiating the communication session in LTE band 25, the UE 110 may disable its ability to receive or otherwise prevent itself from receiving (and possibly also sending) transmissions in one or more of the other, non-selected frequency bands, i.e., one or both of LTE band 26 (814-894 MHz) and LTE band 41 (2496-2690 MHz).

In operation, the UE 110 may prevent itself from receiving (and possibly also sending) transmissions in non-selected frequency bands in one or more different ways, including disabling radios, activating filters, and/or implementing software-based lockouts.

In some implementations, the UE 110 may disable its ability to receive and send transmissions in one or more non-selected frequency bands by powering off or otherwise disabling one or more radios configured for communication in the one or more corresponding non-selected frequency bands. For example, if the UE 110 had three separate radios corresponding to LTE bands 25, 26, and 41, and if band 25 is selected for the communication session, then the UE 110 could disable one or both of (i) the band 26 radio and (ii) the band 41 radio. In some embodiments, powering off one or more radios corresponding to one or more non-selected frequency bands may enable the UE 110 to conserve power, which may be desirable for battery-powered UEs.

In other implementations, the UE 110 may prevent itself from receiving (and possibly also sending) transmissions in one or more of the non-selected frequency bands by activating one or more filters corresponding to the one or more non-selected frequency bands. For example, some UEs may have a single multi-band radio rather than individual radios for individual bands such that powering off or otherwise disabling the radio (or portions thereof) is either impossible or impractical. In those or other embodiments, the UE 110 may activate filters configured to block transmissions in the one or more non-selected frequency bands. To use the LTE example again, if the UE 110 had a multiband radio configured to communicate in at least LTE bands 25, 26, and 41, and if band 25 is selected for the communication session, then the UE 110 could activate filters to block the UE's ability to receive (and possibly also send) transmissions in one or both of LTE band 26 and LTE band 41.

In still further implementations, the UE 110 may prevent itself from receiving (and possibly also sending) transmissions in one or more of the non-selected frequency bands by activating a software-based lockout of one or more of the non-selected frequency bands. In the LTE example, if the UE 110 is configured to communicate in at least LTE bands 25, 26, and 41, and if band 25 is selected for the communication session, then the UE 110 could activate software-based lockouts of one or both of LTE bands 26 and 41 and thereby prevent the UE 110 from receiving (and possibly also sending) transmissions in one or both of the non-selected frequency bands. In some embodiments, rather than preventing the UE 110 from receiving (and optionally sending) transmissions in one or both of the non-selected frequency bands, the software-based lockout could alternatively cause the UE 110 to ignore, disregard, or simply not process transmissions in one or more of the non-selected frequency bands.

In some embodiments, the UE 110 may prevent itself from receiving (and possibly sending) transmissions in one or more non-selected frequency bands for the duration of the communication session. For example, if the communication session is a voice call, the UE 110 may prevent itself from communicating in the one or more non-selected frequency bands until the voice call has ended. To use the LTE example again, if LTE band 25 is selected for the voice call, then the UE 110 may prevent itself from receiving (and possibly also sending) transmissions in one or both of LTE band 41 and LTE band 26 until the voice call has ended. After the voice call has ended, the UE 110 may then re-enable its ability to receive and send transmissions on all of the available frequency bands. Thus, in the LTE example, the UE 110 would re-enable its ability to send and receive on all three available LTE bands, including LTE band 25, LTE band 26, and LTE band 41, after the voice call has ended.

Preventing a UE from engaging in wireless communication in one or more of the non-selected frequency bands while the UE is engaged in a communication session in the selected frequency band has multiple advantages. For example, a network operator may prefer (but not necessarily require) that UEs use certain frequency bands for voice communications and use other frequency bands for high-speed data communications because of differences in signal propagation characteristics of signals within different frequency bands, difference between the air interface protocols in different frequency bands, and/or differences in the amount of bandwidth that might be available in different frequency bands.

In particular, lower frequency signals generally tend to have better signal propagation performance (e.g., traveling farther and penetrating buildings better) than higher frequency signals. Thus, it may be desirable in some instances for a UE to use frequency bands that include lower frequencies for voice communication (or similar real-time, error-intolerant communications) and use frequency bands that include higher frequencies for data communications (or other similar types of communications that are better able to deal with retransmissions due to errors).

Additionally, voice communications typically require a lower amount of bandwidth at a constant rate with low transmission latency whereas data communications typically require a higher amount of bandwidth but at irregular intervals and with greater tolerance for latency as compared to voice. Thus, it may be preferable from a quality of service and/or network bandwidth management standpoint for a UE to implement voice communication sessions in frequency bands that provide (or that may be optimized for) lower latency and to implement data communication sessions in frequency bands that provide (or that may be optimized for) higher bandwidth transmission capability.

In the LTE example, LTE band 25 is frequency division duplex (FDD) with a 65 MHz uplink (i.e., 1850-1915 MHz) and a 65 MHz downlink (i.e., 1930-1995 MHz), LTE band 26 is FDD with a 35 MHz uplink (i.e., 814-849 MHz) and a 35 MHz downlink (i.e., 859-894 MHz), and LTE band 41 is time division duplex (TDD) in a 194 MHz band (i.e., 2496-2690 MHz).

Depending on the configuration, FDD bands (e.g., LTE bands 25 and 26) tend to provide lower latency for real-time (or near real-time), bi-directional communication sessions (e.g., voice calls, video calls, etc.) than TDD bands (e.g., LTE band 41) because in FDD bands, uplink and downlink transmissions are divided by frequency whereas in TDD bands, uplink and downlink transmissions are divided by time. However, depending on the configuration, TDD bands (e.g., LTE band 41) tend to provide higher throughput for high bandwidth communication sessions (e.g., streaming video, large file transfers, etc.) than FDD bands (e.g., LTE bands 25 and 26) because a given upstream or downstream transmission in a TDD band can make use of the entire frequency band (e.g., 194 MHz for LTE band 41) during its transmission time whereas a given upstream or downstream transmission in an FDD band can only make use of half of the frequency band (e.g., 65 MHz for LTE band 25 or 35 MHz for LTE band 26, etc.) Thus, LTE bands 25 and 26 may tend to provide lower latency for communication sessions that have real-time (or near real-time) requirements (e.g., voice calls, video calls, some gaming applications, etc.) whereas LTE band 41 may tend to provide higher bandwidth for more latency tolerant communication sessions (e.g., streaming video or audio that can be buffered at the UE, large file transfers, web browsing, etc.).

In some embodiments, an individual frequency band may include a single range of contiguous frequencies. The single range of frequencies may be defined by an industry standard, but the single frequency range need not be defined by any particular industry standard. In one LTE based example, LTE band 41 spans a single range of frequencies from 2496-2690 MHz. Likewise, other TDD bands in LTE also span a single range of contiguous frequencies, including but not limited to LTE bands 33-40 and 42-44.

Additionally or alternatively, an individual frequency band may include a first range of frequencies and a second range of frequencies, where the first and second ranges are noncontiguous. The first and second non-contiguous ranges may correspond to an industry standard, but the first and second non-contiguous ranges need not be defined by any particular industry standard. In one LTE based example, LTE band 25 includes an uplink portion from 1850-1915 MHz and a downlink portion from 1930-1995 MHz. The uplink and downlink portions are noncontiguous because of the 15 MHz band gap between the end of the uplink at 1915 MHz and the beginning of the downlink at 1930 MHz.

In some LTE embodiments, a frequency band may include multiple LTE bands. For example, a first frequency band may include LTE bands 18, 25, and 26, and a second frequency band may include LTE bands 41, 42, and 44 for example. In these and other embodiments, the UE 110 may initiate a communication session in the first frequency band (i.e., in any of LTE bands 18, 25, or 26). And in response to initiating the communication session in the first frequency band, the UE 110 may then prevent itself from receiving (and perhaps also sending) transmissions in the second frequency band (i.e., in each of LTE bands 41, 42, and 44) by any of (i) powering off or otherwise disabling one or more radios, (ii) activating one or more filters, and/or (iii) activating one or more software-based locks as described herein. Other embodiments may use different groupings for the first and second frequency bands, including but not limited to (i) groupings of different LTE bands (ii) groupings of LTE and non-LTE bands, (iii) groupings of other standards-based bands, (iv) groupings of standards-based and non-standards-based bands, or (v) groupings of non-standards-based bands.

Figure 2:
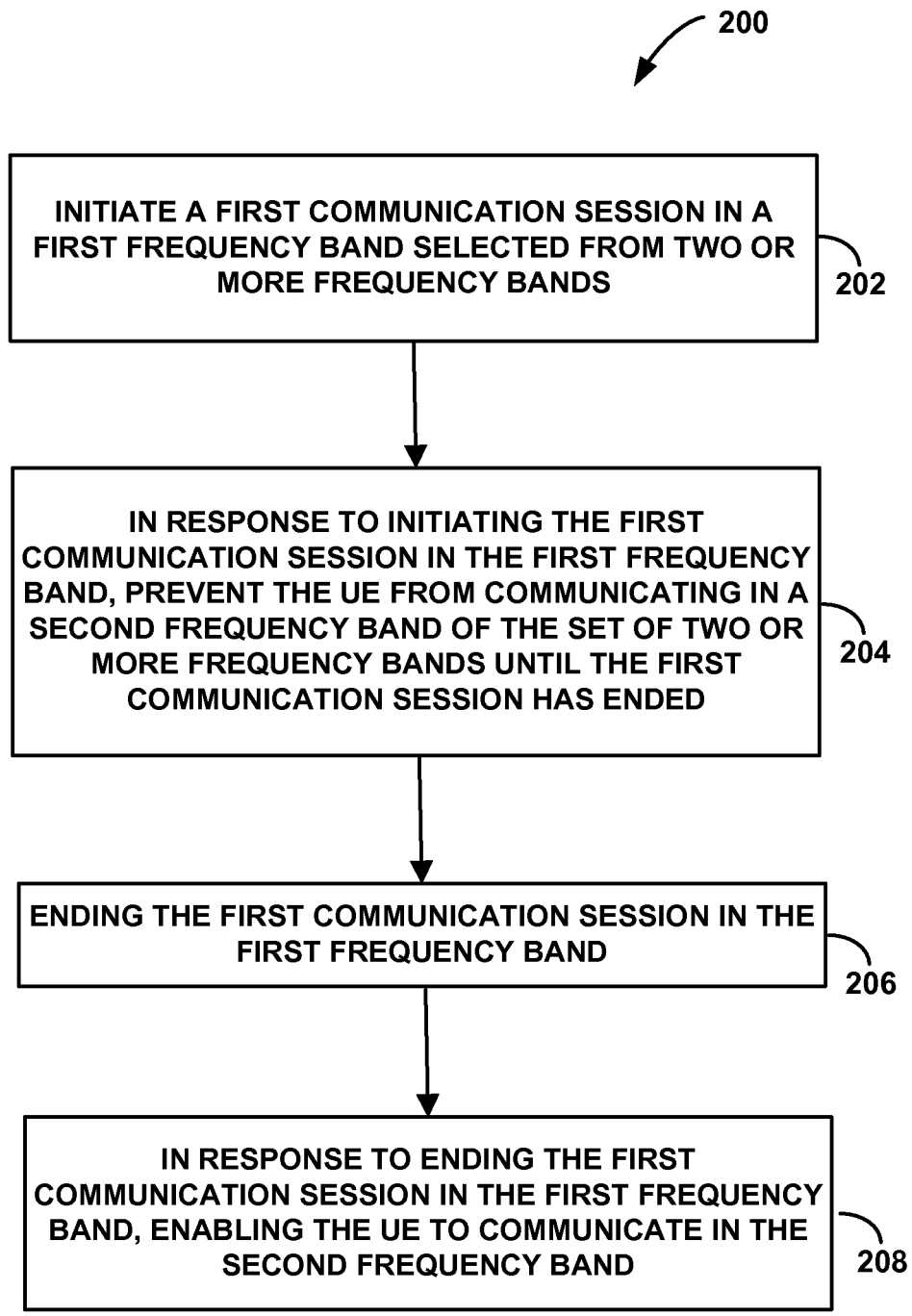
FIG. 2 is a flow chart of functional steps according to some embodiments of the disclosed systems and methods.

FIG. 2 is a flow chart of functional steps according to some embodiments of the disclosed systems and methods. In FIG. 2, method 200 is executed by a UE, such as UE 110 shown and described with respect to FIG. 1. It should be understood, however, that in other examples, method 200 may alternatively be implemented by a UE in combination with other network equipment and devices. Although the blocks are illustrated in a sequential order, the functions illustrated by the blocks may also be performed in parallel, and/or in another order different than described herein.

At block 202, the method 200 includes initiating a first communication session in a first frequency band selected from two or more available frequency bands. In practice, the first communication session may include voice, video, data, or any other type of communication session, including but not limited to any of the communication sessions disclosed elsewhere herein. The UE may initiate the first communication session by any of the mechanisms described herein, including but not limited to signaling or other messaging originating from or received by the UE relating to the initiation of the first communication session or in some other manner. In the context of the example shown in FIG. 1, the two or more available frequency bands of method step 202 would include frequency bands A, B, and C. In operation, each frequency band may include either (i) a single range of contiguous frequencies or (ii) two or more ranges of non-contiguous frequencies as described herein.

At block 204, and in response to initiating the first communication session in the selected first frequency band, the UE prevents itself from communicating in a second frequency band of the set of two or more frequency bands until the first communication session has ended. In operation, the UE may prevent itself from communicating in the second frequency band by any of the mechanisms described herein, including but not limited to (i) powering off or otherwise disabling one or more radios configured to send and/or receive transmissions in the second frequency band, (ii) activating one or more filters configured to block transmissions in the second frequency band, and/or (iii) activating one or more software-based locks to prevent the UE from processing or other taking action in response to transmissions received in the second frequency band.

At block 206, the UE ends the first communication session. At block 208, and in response to ending the first communication session, the UE enables itself to communicate in the second frequency band again. The UE may enable itself to communicate in the second frequency band again by any of the mechanisms described herein, including but not limited to (i) powering on or otherwise enabling one or more previously disabled radios configured to send and/or receive transmissions in the second frequency band, (ii) deactivating one or more previously activated filters configured to block transmissions in the second frequency band, and/or (iii) deactivating one or more previously activated software-based locks.

Figure 3:
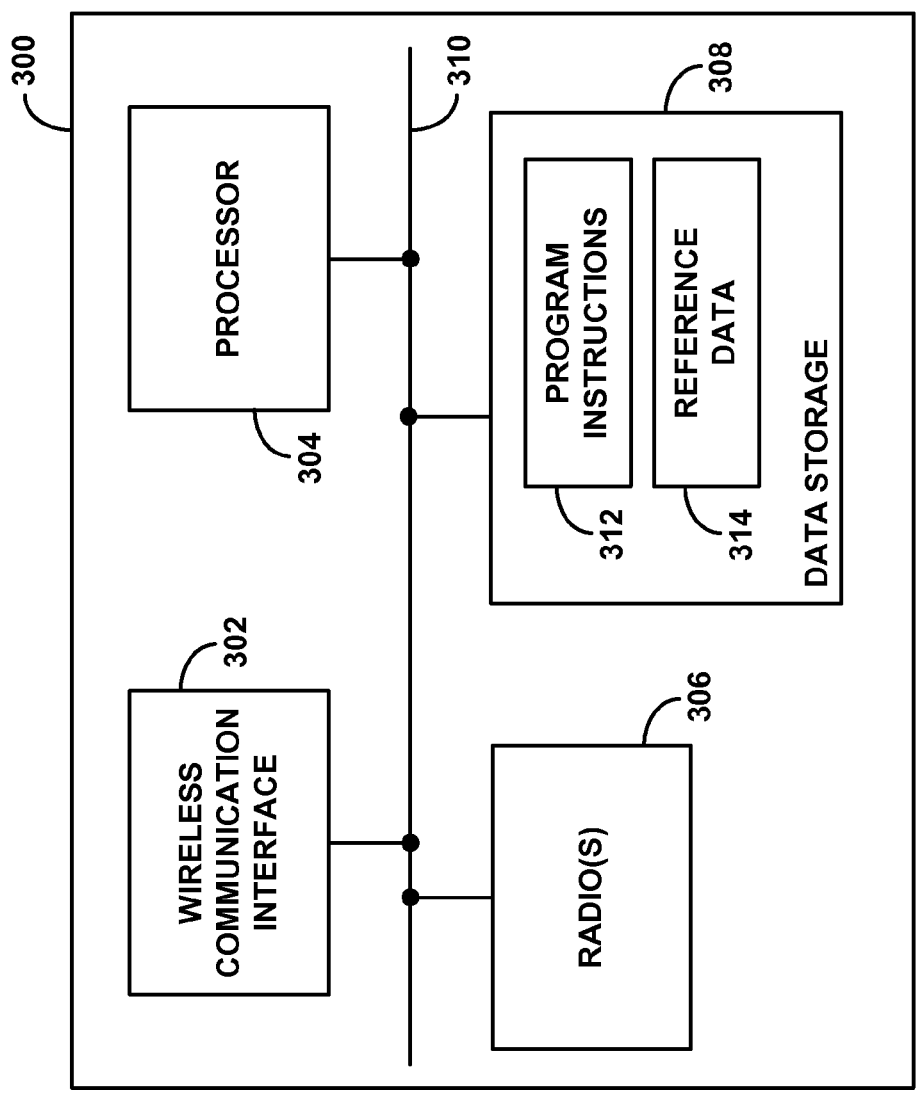
FIG. 3 is a simplified block diagram of a UE according to some embodiments of the disclosed systems and methods.

FIG. 3 is a simplified block diagram of an example UE 300 according to some embodiments. The UE 300 is configured to operate in a communication system, such as the wireless communication system 100 shown and described in FIG. 1 for example, and may execute one or more functions of method 200 shown and described in FIG. 2, for example.

The UE 300 includes a wireless communication interface 302, processor 304, one or more radios 306, and non-transitory data storage 308, all of which may be communicatively linked together by a system bus, network, or other connection mechanism 310. Variations from this arrangement are possible as well, including addition and/or omission of components, combination of components, and distribution of components in any of a variety of ways.

Wireless communication interface 302 includes components configured to engage in air interface communication with a RAN. For example, the wireless communication interface 302 may include one or more antenna structures and chipsets arranged to support wireless communication according to one or more air interface protocols, such as the ones described herein (e.g., CDMA, GSM, LTE, etc.).

The one or more radios 306 are configured to support wireless communications in a set of frequency bands. In some embodiments, the UE 300 may have separate radios for each frequency band. In other embodiments, the UE 300 may have a multi-band or wideband radio configured to support communications in multiple bands. In still further embodiments, the UE 300 may have multiple multi-band and/or wideband radios, where individual multi-band or wideband radios are configured to support communications in one or more corresponding frequency bands. The radio 306 may be integrated in whole or in part with the wireless communication interface 302 in some example embodiments.

The non-transitory data storage 308 comprises one or more volatile and/or non-volatile storage components. The storage components may include one or more magnetic, optical, and/or flash memory components for example. In some embodiments, the non-transitory data storage 308 may be integrated in whole or in part with the processor 304. Additionally or alternatively, the non-transitory data storage 308 may be provided separately as a non-transitory machine readable medium.

The non-transitory data storage 308 may hold (e.g., contain, store, or otherwise be encoded with) program instructions 312 (e.g., machine language instructions or other program logic, markup or the like) executable by the processor 304 to carry out the various functions described herein. The non-transitory data storage 308 may also hold reference data 314 for use in carrying out various functions described herein, such as one or more lists of coverage areas, available frequency bands, available carrier frequencies (e.g., Preferred Roaming List, etc.).

The processor 304 includes one or more general purpose processors (e.g., microprocessors) and/or special purpose processors (e.g., application specific integrated circuits or the like). In some embodiments, the processor 304 may be integrated in whole or in part with wireless communication interface 302.

In operation, the UE 300 is configured to initiate and engage in wireless communication sessions, such as voice, video, and data communication sessions, including but not limited to any of the communication sessions described herein. In operation, the UE 300 initiates a wireless communication session in at least one frequency band selected from a set of two or more frequency bands. In the context of the example shown in FIG. 1, the two or more frequency bands include frequency bands A, B, and C. In operation, each frequency band may include either (i) a single range of contiguous frequencies or (ii) multiple ranges of non-contiguous frequencies as described herein.

In some embodiments, the UE 300 may be a LTE device configured to perform the UE functions described herein. For example, the UE 300 may initiate a wireless communication session in one LTE band selected from a set of two or more available LTE bands. In some embodiments, the set of two or more available LTE bands may include LTE bands 25, 26, and 41. In some embodiments, the two or more available LTE bands include at least one FDD band and at least one TDD band.

In some implementations, the UE 300 (alone or in combination with the RAN) may select the band to use for the first communication session based on the type of communication session (e.g., voice vs. video vs. data, etc.). In operation, the reference data 314 and/or program instructions 312 in the data storage 308 may include instructions for which band the UE 300 should select and perhaps an order of preference. In a voice call example, the processor 304, based on program instructions 312 and/or reference data 314, may instruct the UE 300 to (i) select LTE band 25 first, (ii) select LTE band 26 if LTE band 25 is not available (because of RF conditions or traffic loading for example), and (iii) select LTE band 41 if LTE bands 25 and 26 are not available. Similarly, in a data transmission example, the processor 304, based on program instructions 312 and/or reference data 314, may instruct the UE 300 to (i) select LTE band 41 first, (ii) select LTE band 25 if LTE band 41 is not available, and (iii) select LTE band 26 if LTE bands 41 and 25 are not available. In other embodiments, the UE 300 may exchange signaling with the RAN to negotiate and select the particular frequency band in which to initiate the communication session. In still further embodiments, the RAN may select the frequency band for the communication session, and then instruct the UE 300 to use the selected frequency band for the communication session.

In response to initiating the communication session in the selected frequency band, the processor 304 then may prevent the UE 300 from communicating in one or more of the non-selected frequency bands. In the LTE example, in response to the UE 300 initiating a voice call on LTE band 25, the processor 304 prevents the UE 300 from communicating on LTE band 41 (and perhaps additionally on LTE band 26 in some embodiments).

In some LTE-based implementations, in response to the UE 300 initiating a voice call in any FDD LTE band, the processor 304 prevents the UE 300 from communicating in all TDD LTE bands. In some embodiments, in response to the UE initiating a voice call in any FDD LTE band, the processor prevents the UE 300 from communicating in all TDD LTE bands but still allows the UE 300 to communicate in other FDD LTE bands so that the UE 300 can hand off the communication session to other FDD LTE bands but not to a TDD LTE band. In such embodiments, the set of two or more available frequency bands may include (i) a first frequency band comprising one or more FDD bands and (ii) a second frequency band comprising one or more TDD bands. However, other groupings and configurations of frequency bands are possible as well, including groupings and configurations of frequency bands other than LTE, e.g., CDMA, GSM, etc.

In operation, the processor 304 may prevent the UE 300 from communicating in the non-selected band (or bands) by any of the mechanisms described herein, including but not limited to (i) powering off or otherwise disabling the one or more radios 306 configured to send and/or receive transmissions in the non-selected band (or bands), (ii) activating one or more filters in the wireless communication interface 302 configured to block transmissions in the non-selected band (or bands), and/or (iii) activating one or more software-based locks based on the program instructions 312 and/or reference data 314 to prevent the UE 300 from processing or taking action in response to transmissions received in the non-selected band (or bands).

While various aspects have been disclosed herein, other aspects will be apparent to those of skill in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method performed by a wireless user equipment device (UE) configured to support wireless communication in a set of two or more frequency bands, the method comprising:
    initiating a first wireless communication session in a first frequency band of the two or more frequency bands; and
    in response to initiating the first wireless communication session in the first frequency band, preventing the UE from communicating in a second frequency band of the set of two or more frequency bands until the first wireless communication session has ended, wherein preventing the UE from communicating in the second frequency band comprises activating one or more filters to block signal reception in the second frequency band.

2. The method of claim 1, further comprising:
    ending the first wireless communication session in the first frequency band; and
    in response to ending the first wireless communication session in the first frequency band, enabling the UE to communicate in the second frequency band of the set of two or more frequency bands.

3. The method of claim 1, wherein preventing the UE from communicating in a second frequency band of the set of two or more frequency bands until the first wireless communication session has ended further comprises:
    powering off a radio in the UE configured to communicate in the second frequency band.

4. The method of claim 1, wherein preventing the UE from communicating in a second frequency band of the set of two or more frequency bands until the first wireless communication session has ended further comprises:
    preventing the UE from communicating on all frequency bands of the set of two or more frequency bands other than the first frequency band until the first wireless communication session has ended.

5. The method of claim 1, wherein preventing the UE from communicating in a second frequency band of the set of two or more frequency bands until the first wireless communication session has ended further comprises:
    preventing the UE from communicating in a selected plurality of the set of two or more frequency bands other than the first frequency band until the first wireless communication session has ended.

6. The method of claim 1, wherein the first wireless communication session is a voice over IP communication session or a video communication session.

7. The method of claim 1, wherein the first frequency band includes a single range of frequencies.

8. The method of claim 1, wherein the first frequency band includes a first range of frequencies and a second range of frequencies, wherein the first and second ranges are noncontiguous.

9. The method of claim 1, wherein the UE is a Long Term Evolution (LTE) device, wherein the first frequency band includes at least one of LTE bands 25 or 26, and wherein the second frequency band includes LTE band 41.

10. A wireless user equipment device (UE) comprising:
    one or more radios configured to support wireless communications in a set of two or more frequency bands;
    one or more processors configured to (i) initiate a first wireless communication session in a first frequency band of the set of two or more frequency bands, and (ii) in response to initiating the first wireless communication session in the first frequency band, prevent the UE from communicating in a second frequency band of the set of two or more frequency bands until the first wireless communication session has ended wherein preventing the UE from communicating in the second frequency band comprises activating one or more filters to block signal reception in the second frequency band.

11. The UE of claim 10, wherein the one of more processors are further configured to enable the UE to communicate in the second frequency band of the set of two or more frequency bands in response to ending the first wireless communication session in the first frequency band.

12. The UE of claim 10, wherein preventing the UE from communicating in the second frequency band further comprises powering off a radio of the one or more radios that is configured to communicate in the second frequency band.

13. The UE of claim 10, wherein in response to initiating the first wireless communication session in the first frequency band, the one of more processors are further configured to prevent the UE from communicating on all frequency bands of the set of two or more frequency bands other than the first frequency band until the first wireless communication session has ended.

14. The UE of claim 10, wherein in response to initiating the first wireless communication session in the first frequency band, the one of more processors are further configured to prevent the UE from communicating in a selected plurality of the set of two or more frequency bands other than the first frequency band until the first wireless communication session has ended.

15. The UE of claim 10, wherein the first wireless communication session is a voice over IP communication session or a video communication session.

16. The UE of claim 10, wherein the first frequency band includes a single range of frequencies.

17. The UE of claim 10, wherein the first frequency band includes a first range of frequencies and a second range of frequencies, wherein the first and second ranges are noncontiguous.

18. The UE of claim 10, wherein first frequency band includes at least one of Frequency Division Duplex (FDD)

band, and wherein the second frequency band includes at least one Time Division Duplex (TDD) band.

\* \* \* \* \*